United States Patent
Natanzon et al.

(10) Patent No.: US 8,495,304 B1
(45) Date of Patent: Jul. 23, 2013

(54) MULTI SOURCE WIRE DEDUPLICATION

(75) Inventors: Assaf Natanzon, Ramat-Gan (IL); Ivan Andreyev, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 272 days.

(21) Appl. No.: 12/977,651

(22) Filed: Dec. 23, 2010

(51) Int. Cl.
*G06F 12/00* (2006.01)

(52) U.S. Cl.
USPC .......................................................... 711/133

(58) Field of Classification Search
None
See application file for complete search history.

(56) References Cited

U.S. PATENT DOCUMENTS

| | | | |
|---|---|---|---|
| 7,873,809 B2 * | 1/2011 | Kano | 711/216 |
| 7,996,371 B1 * | 8/2011 | Deshmukh | 707/692 |
| 8,140,491 B2 * | 3/2012 | Mandagere et al. | 707/692 |
| 8,156,306 B1 * | 4/2012 | Raizen et al. | 711/202 |
| 2008/0244204 A1 * | 10/2008 | Cremelie et al. | 711/162 |
| 2011/0167221 A1 * | 7/2011 | Pangal et al. | 711/117 |
| 2011/0246430 A1 * | 10/2011 | Prahlad et al. | 707/679 |
| 2012/0143835 A1 * | 6/2012 | Aronovich et al. | 707/696 |
| 2012/0150823 A1 * | 6/2012 | Tofano | 707/692 |

* cited by examiner

*Primary Examiner* — Hiep Nguyen
(74) *Attorney, Agent, or Firm* — Krishnendu Gupta; Joseph D'Angelo

(57) ABSTRACT

A method, system, and program product for data deduplication in a replication environment, the replication environment having a production site, a splitter, and a replication site, wherein the replication site has a journal, comprising determining a digest for each chunk of data of a set of data chunks, determining for each chunk whether the digest is in an index on the production site, determining for which offsets are to be evicted from the cache on the replication site, replacing the chunks in set of chunks that are in the index with an offset, and transmitting the set of chunks, offsets and an eviction list to the replication site.

20 Claims, 9 Drawing Sheets

MULTI SOURCE WIRE DEDUPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for data deduplication in a replication environment, the replication environment having a production site, a splitter, and a replication site, wherein the replication site has a journal, comprising determining a digest for each chunk of data of a set of data chunks, determining for each chunk whether the digest is in an index on the production site, determining for which offsets are to be evicted from the cache on the replication site, replacing the chunks in set of chunks that are in the index with an offset, and transmitting the set of chunks, offsets and an eviction list to the replication site.

BRIEF DESCRIPTION OF THE DRAWINGS

The above and further advantages of the present invention may be better understood by referring to the following description taken into conjunction with the accompanying drawings in which.

DETAILED DESCRIPTION

Figure 1:
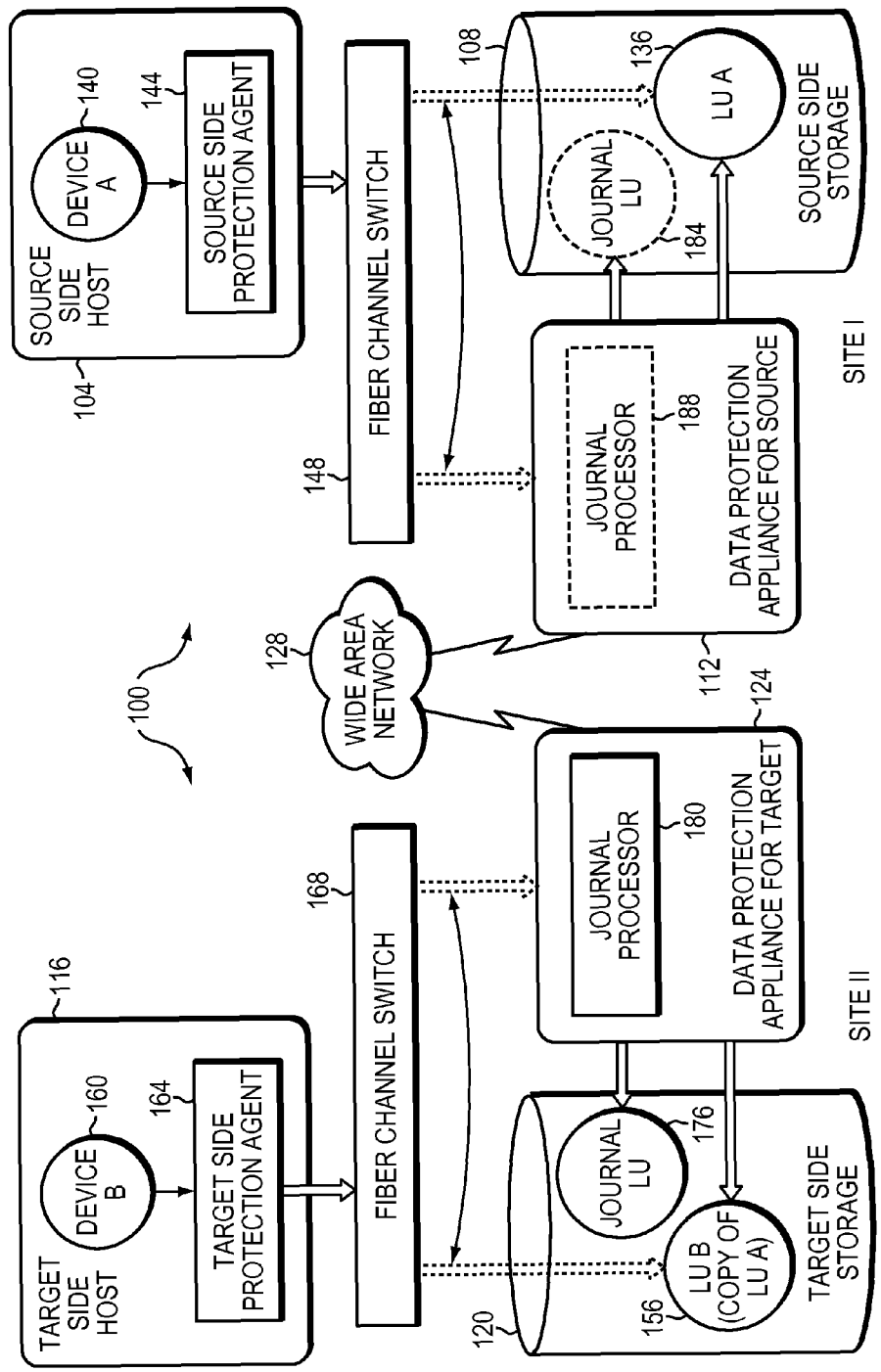
FIG. 1 is a simplified illustration of a data protection system, in accordance with an embodiment of the present invention.

Data deduplication is typically referred to as a means to limit storing of redundant information, usually at a backup site. Generally, most types of data deduplication search for commonalities in the data stored and replace these commonalities with a key. Conventionally, the common data may be stored once in another location, and the key may refer back to this data as a pointer. Typically, the key may appear multiple times, but the data may only appear once.

Conventionally, this type of data deduplication presents complexities for data deduplication in a replication environment. Generally, a replication environment may have multiple sources of production data, which may be written to a replication site. Thus, multiple sources may be writing the same chunks of data to the replication site. Each source production site may have its own catalog and deduplication store and this store may be different than the deduplication store and catalog on the replication site. As well, typical data deduplication assumes that the ordering of the data is maintained. However, generally in a replication environment, such consistency may not always be assumed.

In an embodiment, the current disclosure provides a method for deduplicating data with one global memory address space, over a WAN, where the data may come from multiple sources. In some embodiments, the current disclosure enables an eviction mechanism to minimize data sent over the communication channel in both directions when write ordering between sources is not guaranteed. In certain embodiments, the integrity of data may be maintained. In still other embodiments, instead of sending signatures to the deduplication site, data pointers to a table are sent. Thus, in some embodiments, the current invention enables data deduplication in a journal based replication environment where data may be coming from multiple source and multiple arrays.

The following definitions are employed throughout the specification and claims.
  BACKUP SITE—a facility where replicated production site data is stored; the backup site may be located in a remote site or at the same location as the production site;
  CLONE—a clone may be a copy or clone of the image or images, drive or drives of a first location at a second location;
  CONSISTENCY GROUP—may be a group of storage devices which are being replicated for which write order fidelity is maintained.
  DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.
  DPA—a computer or a cluster of computers that serve as a data protection appliance, responsible for data protection services including inter alia data replication of a storage system, and journaling of I/O requests issued by a host computer to the storage system;
  HOST—at least one computer or networks of computers that runs at least one data processing application that issues I/O requests to one or more storage systems; a host is an initiator with a SAN;
  HOST DEVICE—an internal interface in a host, to a logical storage unit;
  IMAGE—a copy of a logical storage unit at a specific point in time;
  INITIATOR—a node in a SAN that issues I/O requests;
  JOURNAL—a record of write transactions issued to a storage system; used to maintain a duplicate storage system, and to rollback the duplicate storage system to a previous point in time;
  LOGICAL UNIT—a logical entity provided by a storage system for accessing data from the storage system;
  LUN—a logical unit number for identifying a logical unit;
  PHYSICAL STORAGE UNIT—a physical entity, such as a disk or an array of disks, for storing data in storage locations that can be accessed by address;
  PRODUCTION SITE—a facility where one or more host computers run data processing applications that write data to a storage system and read data from the storage system;
  SAN—a storage area network of nodes that send and receive I/O and other requests, each node in the network being an initiator or a target, or both an initiator and a target;
  SOURCE SIDE—a transmitter of data within a data replication workflow, during normal operation a production site is the source side; and during data recovery a backup site is the source side;
  SNAPSHOT—a Snapshot may refer to differential representations of an image, i.e. the snapshot may have pointers to the original volume, and may point to log volumes for changed locations. Snapshots may be combined into a snapshot array, which may represent different images over a time period.
  STORAGE SYSTEM—a SAN entity that provides multiple logical units for access by multiple SAN initiators
  TARGET—a node in a SAN that replies to I/O requests;
  TARGET SIDE—a receiver of data within a data replication workflow; during normal operation a back site is the target side, and during data recovery a production site is the target side;
  WAN—a wide area network that connects local networks and enables them to communicate with one another, such as the Internet.
  Digest—may be a hash value which for any practical purpose can identify a chunk of data uniquely, typically the digest size would be 20 bytes A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
  Redirect the SCSI command to another logical unit.
  Split the SCSI command by sending it first to the respective DPA. After the DPA returns an acknowledgement, send the SCSI command to its intended logical unit.
  Fail a SCSI command by returning an error return code.
  Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIG. 2, journal entries include four streams, two of which are written when write transaction are entered into the journal, and two of which are written when write transaction are applied and removed from the journal.

Figure 2:
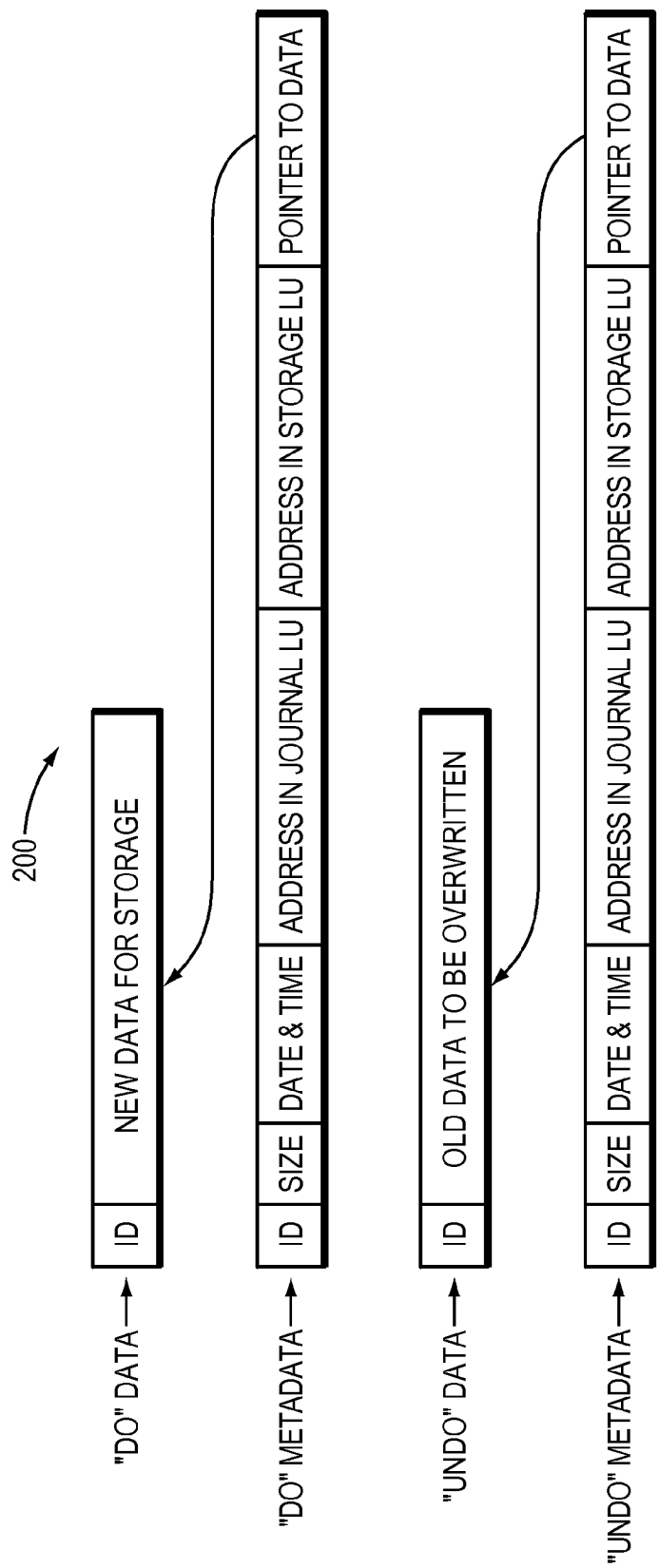
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Data Deduplication

In an embodiment, the current disclosure enables data deduplication with a global memory address space, over a WAN, where the data for the deduplication may come from multiple sources. In some embodiments, the current disclosure enables a mechanism to reduce data sent over the communication channel in both directions when write ordering between sources is not guaranteed. In certain embodiments, data and pointers to a table may be sent to the replication site. In some embodiments, the current invention enables data deduplication in a journal based replication environment where data may be coming from multiple source and multiple arrays.

Conventionally, data deduplication presents complexities for data deduplication in a replication environment. Generally, a replication environment may have multiple sources of production data, which may be written to a replication site. Thus, multiple sources may be writing the same chunks of data to the replication site. However, typical data deduplication assumes that the ordering of the data is maintained.

Generally in a replication environment, such consistency may not always be assumed. Further, in a typical replication environment, the production site may keep and index containing the digests of the data and an offset of where the digest is stored, the replica site keeps a full copy of the data, as well as offsets of where the data is stored. Typically as the system does not guarantee data ordering between data of different consistency groups (CG), there may not be consistency as to when the data arrives at the replication device. Generally, this may be because compression and deduplication are CPU intensive and performed in the background. Conventionally, the ordering of the data may occur after compression and de-duplication based on the network queues. In some embodiments, the current disclosure enables multi sources of production data replicated to a replication site.

In some embodiments, the system decides on the ordering between the CGs only after data is compressed and de-duplicated. In certain embodiments, there are many sources of the data, as the replicated data is replicated in consistency groups. In most embodiments, each consistency group has a set of volume replicated and a replication policy, such as require RPO (recovery point objective) and priority. In certain embodiments, since the WAN may be a bottleneck, data may be reordered between consistency groups, in a way that data of one consistency group may be sent before data of second consistency group. In further embodiments, this reordering of the data may occur given that the data of the second consistency group arrived later.

In some embodiments of the current disclosure, there may be limited memory for in-memory data cache and in-memory deduplication index. In certain embodiments, there may be multi-threaded lookups in the data cache and deduplication index and network packets ordering may not be guaranteed. In further embodiments, network packets delivery may not guaranteed.

In certain embodiments, at the production site, for data to be replicated and sent to the replication site, a vector of chunks of the data may be created. In some embodiments, the chunks may be fixed size or they may be dynamic. In other embodiments, a vector of data chunks may arrive to the index module of the transmitter identified by a Unique Identifier (UID). In some embodiments, a vector of chunks may be a set of chunks in other embodiments a vector of chunks may be a list of chunks. In certain embodiments, a vector may be a queue or other ordered data structure to order or contain the chunks.

In certain embodiments, digests may be calculated for the data chunks. In most embodiments, the index may be checked to find duplicates using calculated digests. In these embodiments, if a digest already exists in the index, its entry's reference count may increased by one. In these embodiments, the data cache offset kept in the index may be passed to upper layer. In some embodiments, the digest may be 20 bytes and uniquely identifies the data. In certain embodiments the digest may be calculated based on the data itself. In further embodiments, the index may be 4 bytes and also identify the chunk uniquely, but may not be calculated from the data. In further embodiments, if a digest does not exist in the index, it may not be added immediately. In these embodiments, it may be stored in the acknowledge wait list, identified by UID.

In some embodiments, each chunk of the vector may contain known de-duplicated data offsets in the data cache on the remote, whole chunks of unknown data to be added to the data cache on the remote, and an eviction list of offsets. Thus, this vector may represent data chunks that have sent to the replication site and acknowledged, where the data chucks may be represented in the vector by the offset/index of the chunk in the remote cache. The unknown data may represent data which has not previously been sent to the replication site from this production site. The vector may further contain data that may be ejected from the replication site's cache as the de-duplicated data is no longer needed.

In some embodiments, data transaction UIDs may be sent to the remote replication site from the production site along with the data for deduplication.

In some embodiments, the remote replication device may receive the vector. In certain embodiments, the received data may contain a list of offsets to be evicted from the data cache. In further embodiments, this data may be evicted as it is received. In at least some embodiments, the data may contain a list of 'known' data offsets in the data cache which may be fetched and provided to the application immediately. In other embodiments, the data may contain a list of new data chunks which may be added to the cache immediately. In further embodiments, a list of offsets may be provided to the application containing the location in the cache where new data was inserted.

In these embodiments, the replication site may send an acknowledgment message for the UIDs received and the offsets to the newly added data cache entries.

In some embodiments, the acknowledgement may also serve for eviction purposes, i.e. no new data was added but there were some evictions, an empty acknowledgement message may be sent. In other embodiments, an acknowledge waitlist may be processed at the production site. In some embodiments the entries for the UIDs may be added to the index and cache. In alternative embodiments, the previously existed entries may have their reference counters decreased. In other embodiments, evictions may be added to the eviction waitlist to be sent on the next turn.

In certain embodiments, de-acknowledgments for UIDs received may be sent indicating that there is no space to store the data or there is no data to be stored. In at least some embodiments, entries for UIDs may be discarded from the acknowledge waitlist at the production site. In further embodiments, entries to be evicted may be preserved to be re-sent to the production site on the next turn.

Figure 3:
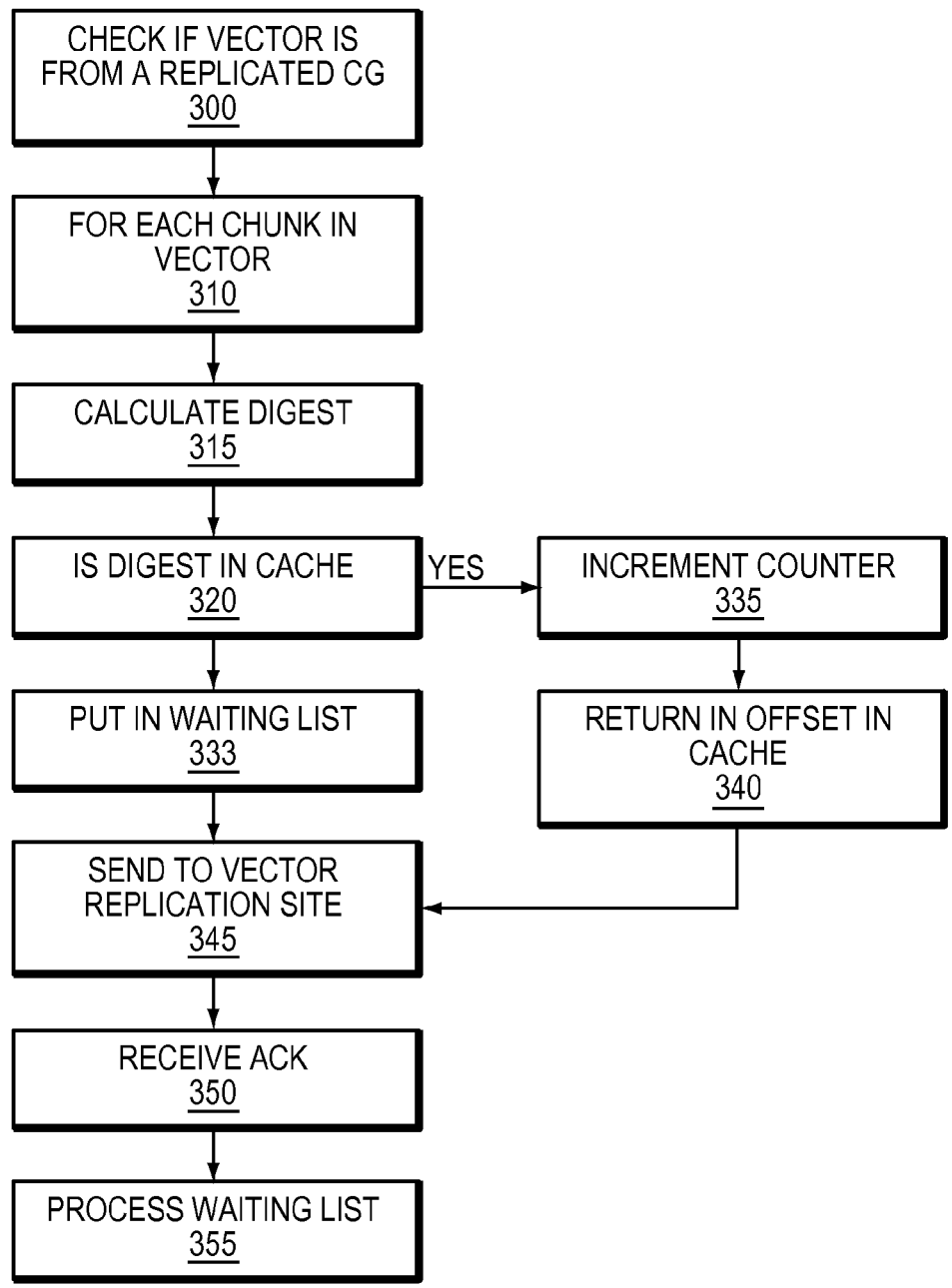
FIG. 3 is a simplified embodiment of a method for deduplication in accordance with an embodiment of the present invention.
Figure 4:
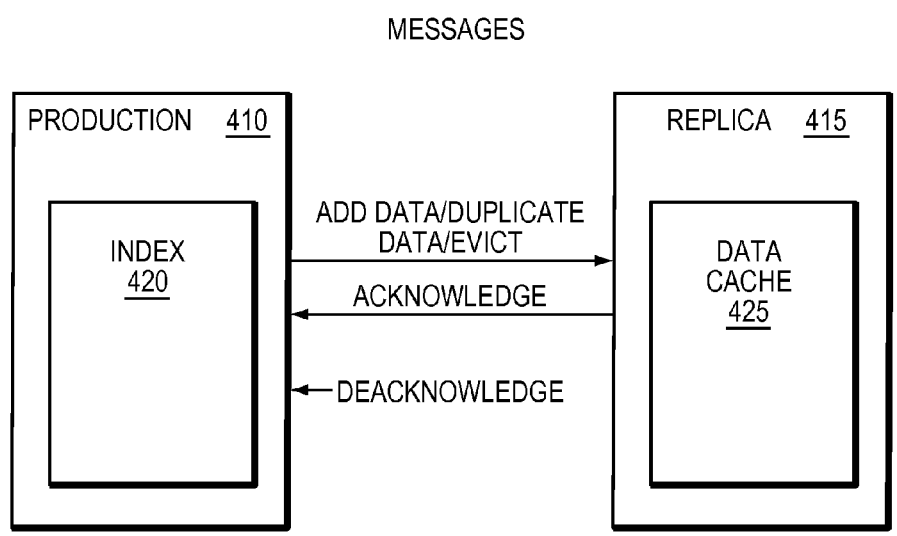
FIG. 4 is a simplified embodiment of deduplication between a production and replication site, in accordance with an embodiment of the present invention.

Refer now to the example embodiments of FIGS. 3 and 4. The production site 410 may get a vector with a set of chunks. The production site may check if the vector is from a consistency group being de-duplicated (step 300), if not, the vector is ignored. The production site may perform a set of functions for each chunk in the vector (step 310). The production site may calculate the digest for the chunk (step 315). The production site 410 determines if the digest is in the cache/index 420 (step 320). If the digest is in the cache 420, the counter in the index may be incremented for the index (step 335). The offset in the cache may be returned to replace the data in the vector (step 340). If the digest is not in the cache, the digest and chunk may be placed in the waiting list (step 333). The production site 410 sends the information to the replications site 415 (step 345). The production site 410 receives an acknowledgement from the replication site 415 (step 350). The production site 410 processes the information in the wait list (step 355).

Figure 5:
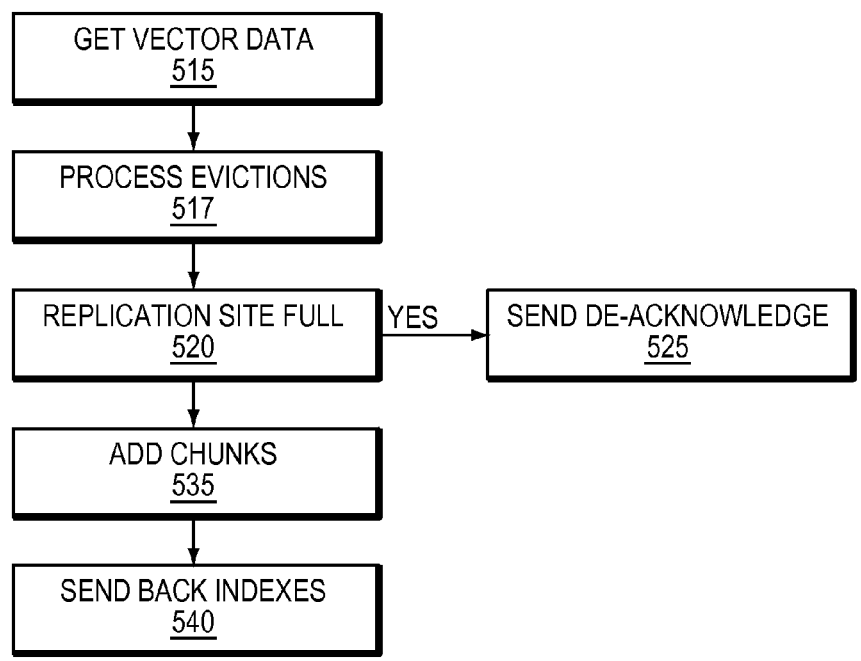
FIG. 5 is an alternative simplified embodiment of deduplication between a production and replication site, in accordance with an embodiment of the present invention.

Refer now to the example embodiments of FIGS. 4 and 5. The replication site 415 may receive the vector data (step 515). Evictions are processed, i.e. all cache entries in the eviction list are freed (step 517). It is determined whether the replication site 415 is cache full (step 520). If the replication site 415 cache is full, a negative acknowledgement is sent to the production site 410 (step 525). If the replication site 415 is not full, new chunks are added (step 535). Indexes to the new information are sent back to the production site with a positive acknowledgement, including the indexes in the cache of the newly added data (step 540).

Figure 6:
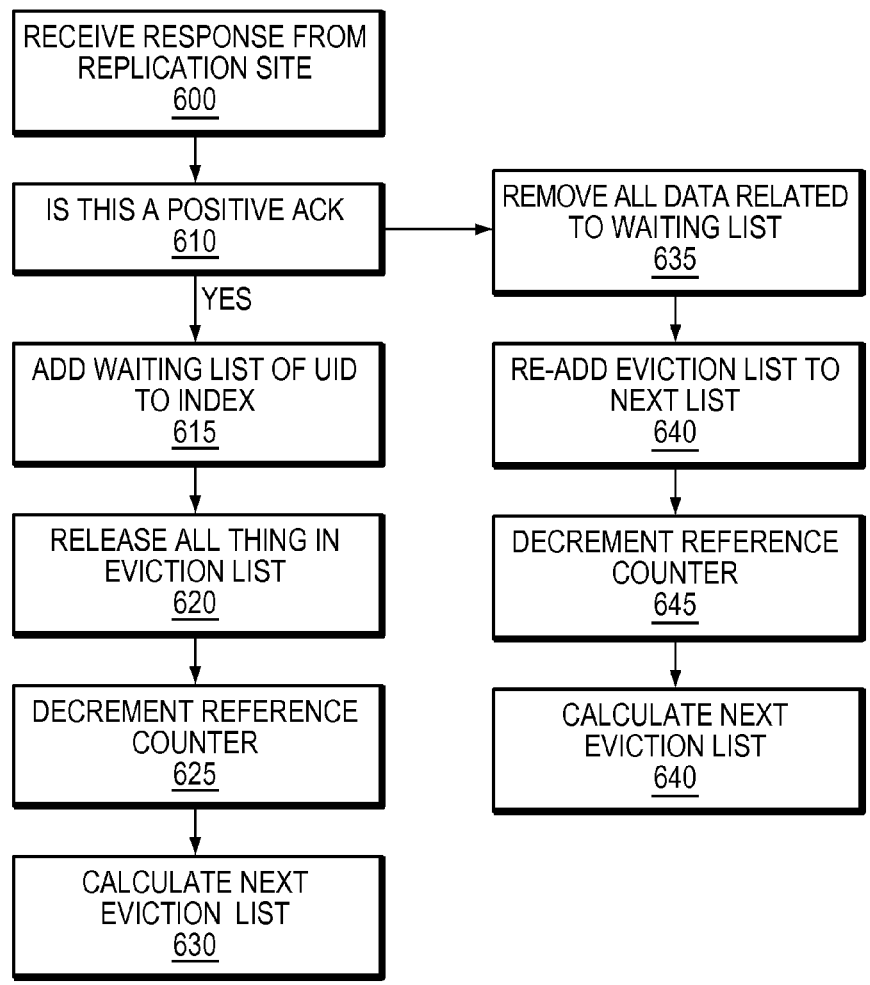
FIG. 6 is an alternative simplified embodiment of a method of deduplication, in accordance with an embodiment of the present invention.

Refer now to the example embodiments of FIGS. 4 and 6. The production 410 site receives an acknowledgement (step 600). It is determined if this is a positive or a negative acknowledgement (step 610). If this is a positive acknowledgement, the waiting list of the UID is added to the index, with the index IDs received from the replica site (step 615). The items in the eviction list are released (step 620). The reference counter is decremented for all items in the waiting list of the UID (step 625). The next eviction list is calculated (step 630). In a negative acknowledgement is received, the data relating to the wait list is removed and discarded (step 635). The eviction list data is added to the next list to be sent to the replication site (640). The reference counter is decremented (step 645). The next eviction list is calculated (step 640).

Figure 7:
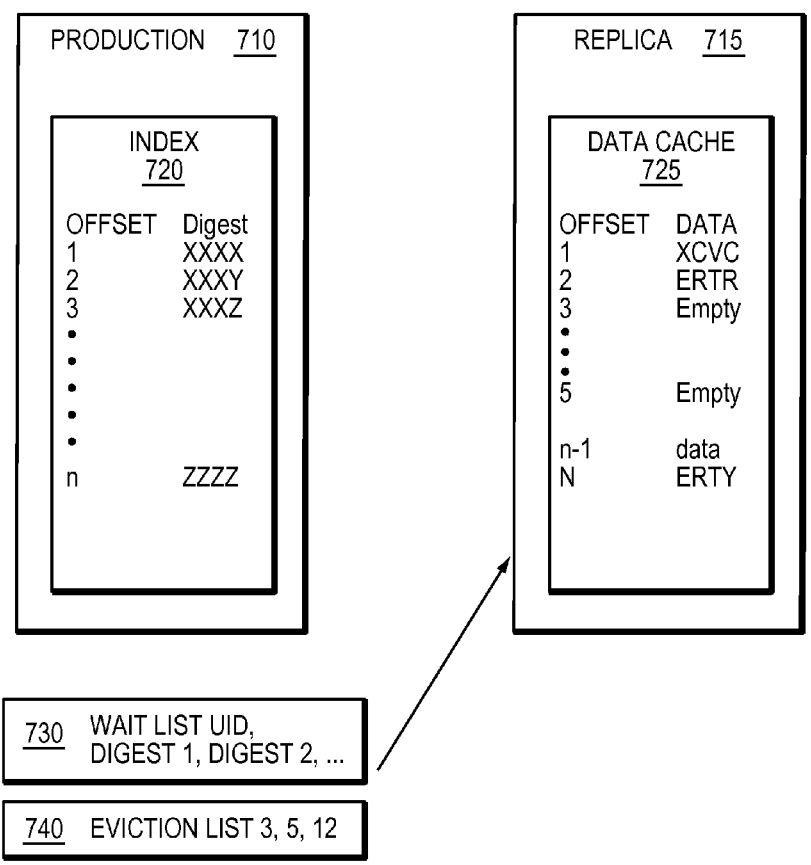
FIG. 7 is an alternative simplified embodiment of deduplication between a production and replication site, in accordance with an embodiment of the present invention.

Refer now to the example embodiment of FIG. 7. FIG. 7 illustrates a production site 710 with an index 720. The index 720 has an offset and a digest. Each offset of Index 720 corresponds to a digest. Replication site 517 has a data cache 725. Data cache has a set of offsets and a set of data, the digest of the data corresponding to an offset is the cache is the same digest stored at the same offset in the production. Production site 730 also has a wait list 730 which has a UID and a set of digests, which contain digest which will be inserted to the index once they are stored at the remote cache. There is also eviction list 740 which contains offsets to be evicted from data cache 725.

In certain embodiments, each consistency group which may be replicated, may be configured to use or not use de-duplication either. In some embodiments, the user may enter the configuration. In alternative embodiments, system may decide based on the effectiveness of de-duplication or based of the application type whether for each CG, de-duplication can be on or off.

Figure 8:
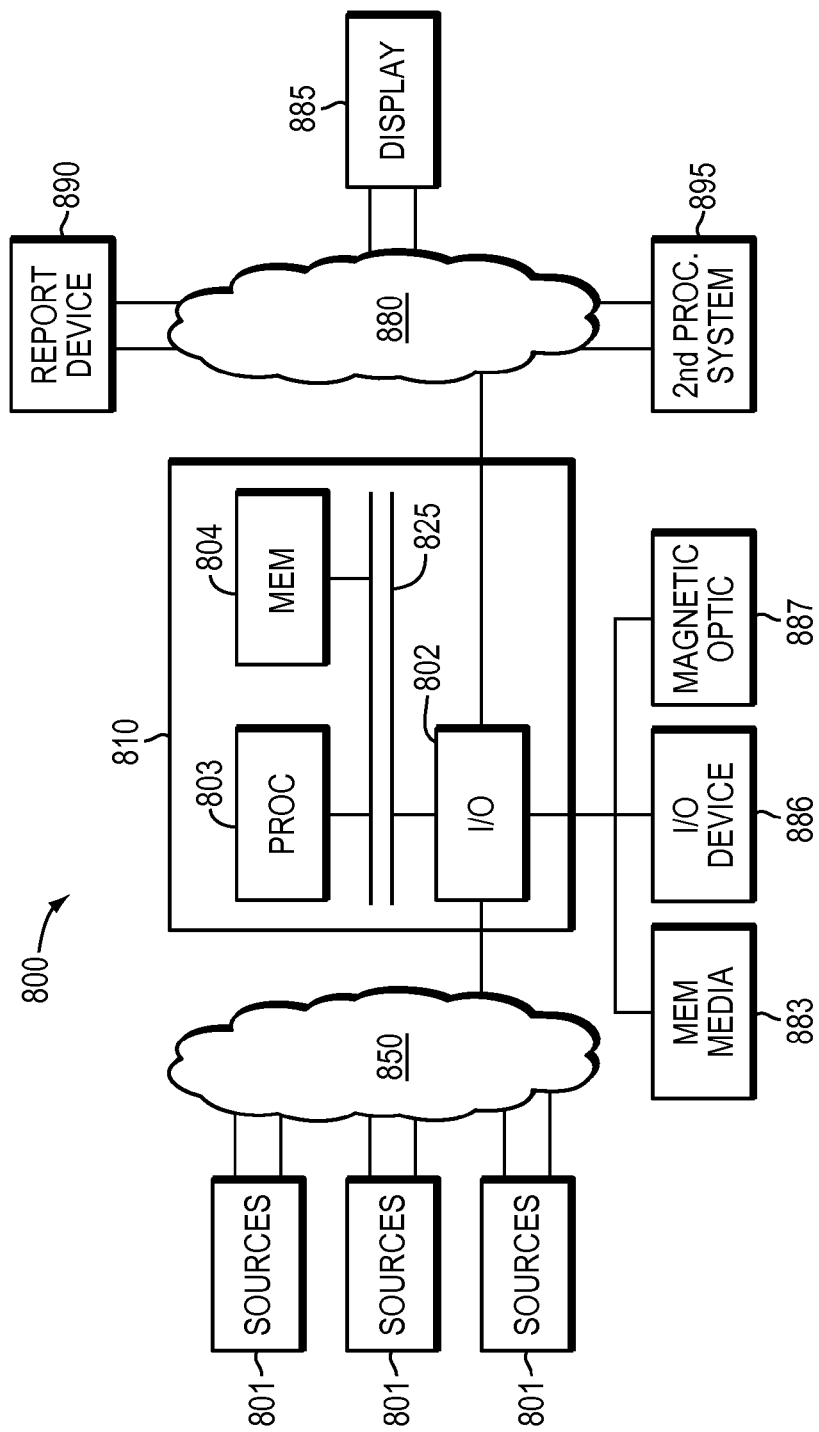
FIG. 8 is a computer loaded with logic, in accordance with an embodiment of the present invention.
Figure 9:
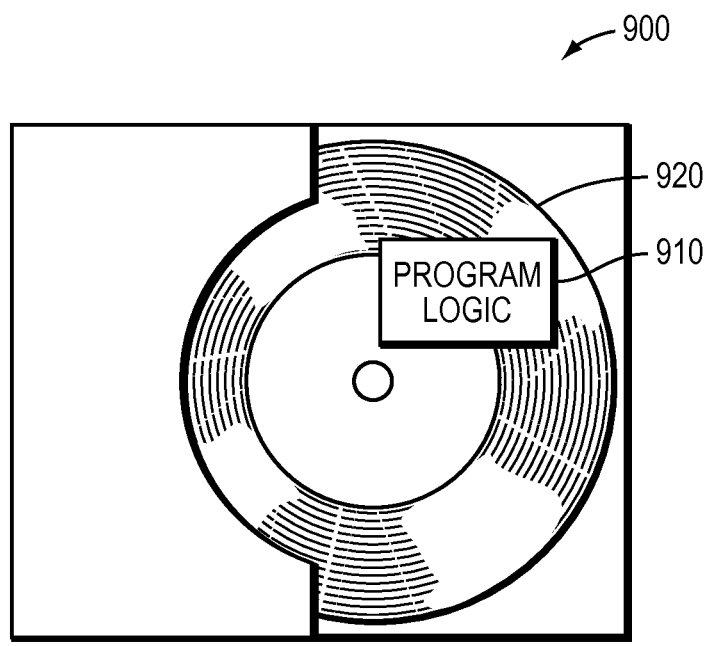
FIG. 9 is an embodiment of the current invention as embodied in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such the logic on memory 704 of FIG. 7 loaded in the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 8 shows Program Logic 810 embodied on a computer-readable medium 830 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for data de-duplication in a replication environment, the replication environment having a production site, a splitter, and a replication site, wherein the replication site has a journal, the method comprising:
determining a digest for each chunk of data of a set of data chunks;
determining for each chunk of the set of data chunks whether the digest is in an index on the production site;
determining which offsets are to be evicted from a cache on the replication site;
replacing data chunks in the set of data chunks that are in the index with an offset; and
transmitting the set of data chunks, the offsets and an eviction list to the replication site.

2. The method of claim 1 further comprising:
determining if data belong to a consistency group (CG) being de-duplicated;
receiving a vector data at the replication site; and
freeing the offsets in the eviction list from the cache.

3. The method of claim 2 further comprising:
determining whether the replication site is full;
based on a positive determination, sending a de-acknowledgement to the production site.

4. The method of claim 3 further comprising:
based on a negative determination, adding the chunks to the cache on the replication site and returning a positive acknowledgement to the production site, including the offsets in which the chunks where added.

5. The method of claim 4 further comprising:
receiving a response at the production site from the replication site;
based on a response of an acknowledgement, adding a waiting list associated with the response to the index; and
releasing the data in the eviction list.

6. The method of claim 3 further comprising:
decrementing a reference counter; and
calculating an eviction list.

7. The method of claim 6 further comprising:
based on a response of a de-acknowledgement, removing all data in a waiting list;
adding old eviction data to a next list.

8. The method of claim 2, where determining whether CG is de-duplicated is determined by a user.

9. The method of claim 2, where determining whether CG is de-duplicated is determined by the replication environment.

10. The method of claim 9, where system determines whether to de-duplicate a CG based on the de-duplication ratio of the CG.

11. The method of claim 9, where system determines whether to de-duplicate a CG based on an application type of the CG.

12. A system for data deduplication in a replication environment, the system comprising:
a production site having an index,
a replication site having a data cache; and
computer-executable logic operating in memory, wherein the computer-executable program logic is configured for execution of the following:
determining a digest for each chunk of data of a set of data chunks;
determining for each chunk of the set of data chunks whether the digest is in an index on the production site;
determining for which offsets are to be evicted from the cache on the replication site;
replacing data chunks in the set of data chunks that are in the index with an offset; and
transmitting the set of data chunks, the offsets and an eviction list to the replication site.

13. The system of claim 12 where in the program logic is further configured for:
determining if data belong to a consistency group (CG) being de-duplicated receiving vector data at the replication site; and
freeing the offsets in the eviction list from the cache.

14. The system of claim 13 where in the program logic is further configured for:
determining whether the replication site is full;
based on a positive determination, sending a de-acknowledgement to the production site.

15. The system of claim 14 where in the program logic is further configured for:
based on a negative determination, adding the chunks to the cache on the replication site and returning a positive acknowledgement to the production site, including the offsets in which the chunks where added.

16. A computer program product comprising:
a non-transitory computer readable medium encoded with computer executable program code for data de-duplication in a replication environment, the replication environment having a production site, a splitter, and a replication site, wherein the replication site has a journal, the code enabling:
determining a digest for each chunk of data of a set of data chunks;
determining for each chunk of the set of data chunks whether the digest is in an index on the production site;
determining which offsets are to be evicted from a cache on the replication site;

replacing data chunks in the set of data chunks that are in the index with an offset; and transmitting the set of data chunks, the offsets and an eviction list to the replication site.

17. The computer program product of claim 16 where in the code further enables:

determining if data belong to a consistency group (CG) being de-duplicated receiving vector data at the replication site; and freeing the offsets in the eviction list from the cache.

18. The computer program product of claim 17 where in the code further enables:

determining whether the replication site is full;

based on a positive determination, sending a de-acknowledgement to the production site.

19. The computer program product of claim 17 wherein determining whether CG is replicated is determined by a user.

20. The computer program product of claim 17 wherein determining whether CG is replicated is determined by the replication environment.

* * * * *